(12) United States Patent
Nakagawa et al.

(10) Patent No.: US 6,569,571 B2
(45) Date of Patent: May 27, 2003

(54) ELECTRODE, SECONDARY BATTERY AND METHOD OF PRODUCING THE SAME

(75) Inventors: Yuji Nakagawa, Tokyo (JP); Toshihiko Nishiyama, Tokyo (JP); Masaki Fujiwara, Tokyo (JP); Gaku Harada, Tokyo (JP); Shinako Kaneko, Tokyo (JP); Masato Kurosaki, Tokyo (JP)

(73) Assignee: NEC Tokin Corporation, Sendai (JP)

( * ) Notice: Subject to any disclaimer, the term of this patent is extended or adjusted under 35 U.S.C. 154(b) by 243 days.

(21) Appl. No.: 09/725,872

(22) Filed: Nov. 30, 2000

(65) Prior Publication Data

US 2002/0132168 A1 Sep. 19, 2002

(30) Foreign Application Priority Data

Dec. 1, 1999 (JP) .......................... 11-342075

(51) Int. Cl.⁷ .............................. H01M 4/64
(52) U.S. Cl. ...................... 429/233; 429/245
(58) Field of Search ............ 429/218.1, 231.5, 429/233, 236, 244, 245, 248

(56) References Cited

U.S. PATENT DOCUMENTS

| | | | | |
|---|---|---|---|---|
| 4,585,715 A | * | 4/1986 | Marple | 429/209 |
| 5,521,029 A | * | 5/1996 | Fiorino et al. | 204/490 |
| 5,616,437 A | * | 4/1997 | Gao | 29/623.5 |
| 5,846,675 A | * | 12/1998 | Sazhin et al. | 205/64 |

FOREIGN PATENT DOCUMENTS

| | | |
|---|---|---|
| JP | 04-206920 | 7/1992 |
| JP | 05-182670 | 7/1993 |
| JP | 09-213339 | 8/1997 |
| JP | 11-121032 | 4/1999 |
| JP | 11-162511 | 6/1999 |

* cited by examiner

Primary Examiner—Patrick Ryan
Assistant Examiner—Monique Wills
(74) Attorney, Agent, or Firm—McGinn & Gibb, PLLC

(57) ABSTRACT

A secondary battery comprises a pair of collectors made of a valve action metal, a pair of electrodes comprising a sulfuric acid aqueous solution, a separator and an outer can. Each collector is covered with an oxide film of a thickness of 1.7–10 nm. The oxide film is formed in a range of from 30% by area or more to less than 100% by area relative to the surface area of the collector. Each collector has one electrode disposed thereon.

30 Claims, 1 Drawing Sheet

ELECTRODE, SECONDARY BATTERY AND METHOD OF PRODUCING THE SAME

BACKGROUND OF THE INVENTION

1. Field of the Invention

The present invention relates to an electrode, a secondary battery and a method of producing the same. More particularly it relates to an electrode, a secondary battery and a method of using a valve action metal for a collector to produce the same with an excellent cyclic property and a film forming property.

2. Description of the Related Art

The size and weight of a mobile device reduced progressively in the field of information communication. In response to this recent situation, thin, low-height and high-energy-density batteries and electric double-layered condensers have been developed increasingly.

An electrode structure for configuring the battery or electric double-layered condenser can be produced by applying onto a collector an electrode composite consisting of an active substance powder (activated carbon powder in the electric double-layered condenser), a conductive auxiliary and an organic binder. When the electrode composite is formed on the collector, the collector and the electrode are required to tightly contact with each other in order to allow the electrode to function sufficiently. In particular, if a collector made of a valve action metal (such as Ta, Nb, Al, W, Mo, Ti, and Sr) and an aqueous electrolytic solution are employed in a battery, a DC current flows into the collector and causes a formation reaction in the surface of the valve action metal to produce an oxide film. As a result, there was a disadvantage that the adherent property of the electrode to the collector worsened to lower the cyclic property of a secondary battery. There was another disadvantage that a mixed electrode paste with an aqueous electrolytic solution had a poor film-forming property on the collector because the valve action metal was not excellent in wetting with the aqueous electrolytic solution.

Several methods for improving the adherent property of the electrode to the collector have been proposed in the art. JP 5-182670A discloses a method for roughening the surface of a collector to adhere an electrode to the collector. This method, however, simply increases the physical adherence of the electrode to the collector using an active substance and therefore gradually causes a peel due to repeated expanding and retracting of the active substance. According to another method which is also used commonly, an anchor layer having a composition near that of the film is provided between a substrate and a film. The anchor layer is required, however, to be conductive in order to transfer electrons between a collector and an electrode and thus suffers many restrictions. In addition, a peel occurs when a thick film cracks.

As described above, according to these conventional methods, it is difficult to obtain an electrode for a secondary battery with a high cyclic property. This problem is considered to inhibit an ideal secondary battery from developing.

SUMMARY OF THE INVENTION

Accordingly, it is an object of the present invention to provide a secondary battery comprising:

a first collector made of a first valve action metal;
a second collector made of a second valve action metal;
a first electrode;
a second electrode;
a separator; and
an outer can,
wherein said first collector is covered with a first oxide film of a thickness of 1.7–10 nm, said first oxide film being formed in a range of from 30% by area or more to less than 100% by area relative to the surface area of said first collector, said first collector having said first electrode disposed thereon;
said second collector is covered with a second oxide film of a thickness of 1.7–10 nm, said second oxide film being formed in a range of from 30% by area or more to less than 100% by area relative to the surface area of said second collector, said second collector having said second electrode disposed thereon.

It is another object of the present invention to provide an electrode for a secondary battery which comprises a collector made of a valve action metal and a paste film formed on said collector, wherein said collector is covered with an oxide film of a thickness of 1.7–10 nm, said oxide film being formed in a range of from 30% by area or more to less than 100% by area relative to the surface area of said collector.

It is another object of the present invention to provide a method of producing a secondary battery comprising a first collector made of a first valve action metal, a second collector made of a second valve action metal, a first electrode, a second electrode, a separator and an outer can, wherein said method comprises:

forming a first oxide film of a thickness of 1.7–10 nm on said first collector, said first oxide film being formed in a range of from 30% by area or more to less than 100% by area relative to the surface area of said first collector;
forming a second oxide film of a thickness of 1.7–10 nm on said second collector, said second oxide film being formed in a range of from 30% by area or more to less than 100% by area relative to the surface area of said second collector;
forming said first electrode on said first collector; and
forming said second electrode on said second collector.

It is another object of the present invention to provide a method of producing an electrode for a secondary battery which comprises:

forming an oxide film of a thickness of 1.7–10 nm on a collector made of a valve action metal, said oxide film being formed in a range of from 30% by area or more to less than 100% by area relative to the surface area of said collector; and
forming a paste film on said collector.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Figure 1:
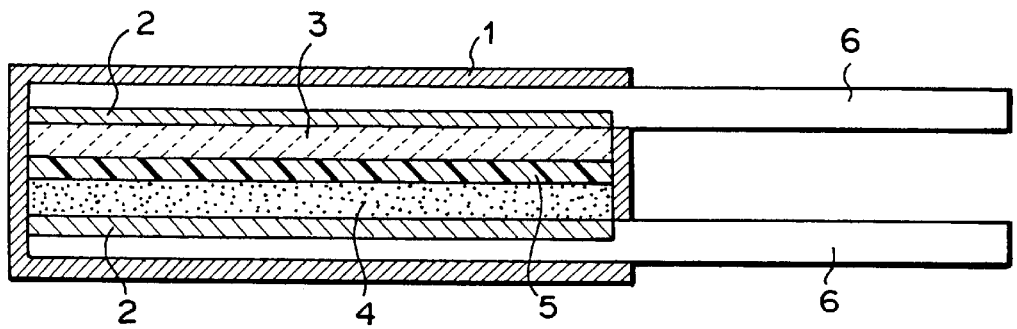
FIG. 1 schematically illustrates the inner structure of a battery according to the present invention.

A method of producing an electrode structure and a secondary battery such as a storage device according to the present invention is described hereunder.

In a process of producing a secondary battery such as a storage device (battery, electrochemical capacitor or electric double-layered condenser), which includes electrodes opposed to each other and formed on collectors made of a valve action metal, and of producing an electrode thereof, a several nm thick oxide film is formed on the collector. Originally, the oxide film is an insulator. Nevertheless, as an extremely thin oxide film with a thickness of several nm is used, a tunnel current flows through the film, and the film is not insulated to form the collector. Thus, the process is characterized in that it includes the step of forming the electrode in the form of a film on the collector.

If a collector made of a valve action metal is employed along with an aqueous electrolytic solution, an oxide film previously formed thereon prevents a formation reaction from proceeding in the surface of the collector in order to allow the oxide film to further grow when a DC current flows into the collector. As a result, the adherent property of the electrode to the collector does not worsen and the cyclic property improves. In addition, the oxide film formed on the valve action metal is wet with an aqueous electrolytic solution because it is more hydrophilic than the valve action metal.

A valve action metal (for example, Ta, Nb, Al, W, Mo, Ti and Sr) is employed for the collector. An oxide film can be formed on the surface of the collector according to two methods:
(1) anodization: applying a DC voltage on the collector to produce the oxide film by formation; and
(2) gas-phase oxidization: oxidizing the collector in a gas phase to form the oxide film.

In the anodization, the DC voltage applied thereon is in the order of several volts. Specifically, a suitable voltage may be determined in accordance with the nature of the collector and is such a formation voltage in a certain range that allows a current to flow into the oxide film. The collector may have a shape, either in the form of a cutout sheet or an elongated sheet, which is not limited specially.

In the gas-phase oxidization, oxidizing conditions to form a several nm thick oxide film are determined for use in air at 400° C. to room temperature for 1 hour, and in an oxidative ambient at 200° C. to room temperature for 1 hour.

The anodization and the gas-phase oxidization give the same property to the oxide film, and thus any one of them may be freely employed. It is easier for the anodization, however, to control the oxide film to have a designated thickness.

The working voltage of the secondary battery applied to the collector is equal to 1 V or higher. In the formation of a tantalum plate, a tantalum pentoxide film with a thickness of 1.7 nm is produced at a formation voltage of 1 V. In the formation of a niobium plate, a niobium pentoxide film with a thickness of 2.4 nm is produced at a formation voltage of 1 V. Therefore, preferably a formation voltage equal to or higher than the working voltage (1–3 V) is previously applied to form the oxide film on the collector so as not to cause a formation reaction during the operation of the secondary battery. For this reason, an oxide film having a thickness of 1.7 nm or more is preferred. Further, although the oxide film is originally an insulator, the oxide film is extremely thin, is not insulated and allows a collector to function. To the contrary, if the oxide film has a thickness over 10 nm, it is possibly insulated, and possibly prevents a collector from functioning. Accordingly, the oxide film preferably has a thickness within a range of 1.7–10 nm.

Preferably the oxide film is formed in a range of from 30% by area or more to less than 100% by area relative to the surface area of the collector. If the oxide film is formed in a range of less than 30% by area relative to the surface area of the collector, the adherent property of the electrode to the collector lowers and the cyclic property easily reduces. If it is formed in a range of 100% by area, the conductivity is possibly lost to exhibit insulation.

The present invention will be described below in detail along with examples.

EXAMPLE 1

FIG. 1 schematically illustrates the inner structure of a battery according to Example 1 of the present invention. A tantalum plate 6 is employed for a collector and a tantalum pentoxide film 2 formed by formation reaction is disposed on the surface of the tantalum plate. Electrodes formed on collectors are arranged as opposed to each other via an insulating, ion-permeable micro-porous separator 5. A laminated material 1 surrounds the peripheral portions of the electrodes to hold the electrodes. The separator 5 lies between a mixture containing a positive electrode active material and carbon powder 3 and a mixture containing a negative electrode active material and carbon powder 4.

A process for producing a battery according to Example 1 has three steps: (1) formation of tantalum collectors; (2) forming of electrodes; and (3) production of a battery.

(1) Formation of Tantalum Collectors

Figure 2:
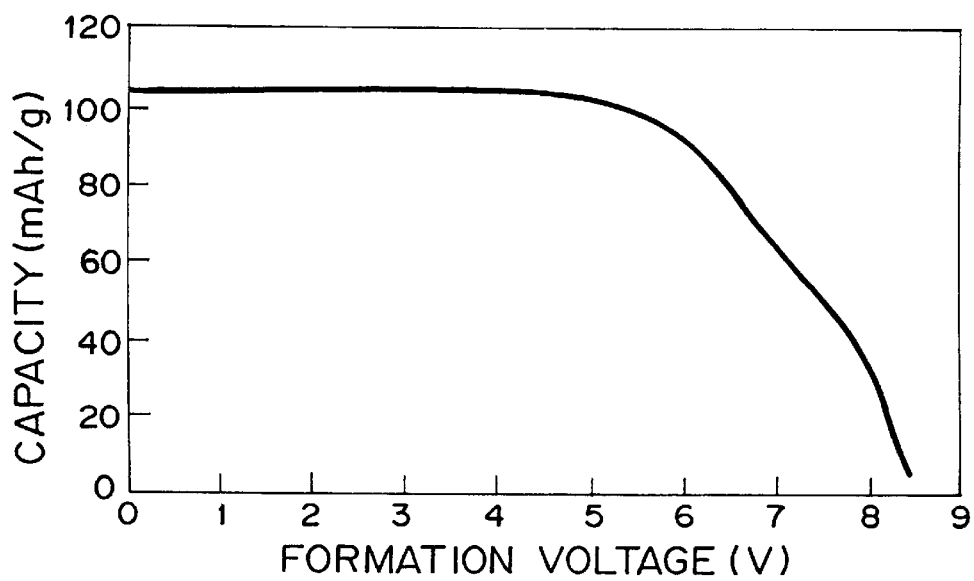
FIG. 2 shows the capacity of a battery versus the formation voltage of a tantalum collector.

A 5-cm square tantalum plate and a SUS plate used for the opposed electrode were immersed into a 0.05–0.6% by weight phosphoric acid (nitric acid or sulfuric acid) solution, and a current of 10 mA/cm$^2$ was supplied thereto. When the voltage reached up to 3 V, it was held during a holding time of 1 hour. The formation voltage was determined in the following manner. FIG. 2 shows the relation between the capacity of an electrode, which has a film of polyphenylquinoxaline (PPQx) formed on the tantalum collector, and the formation voltage of a tantalum plate. When the formation voltage exceeds 5 V, the capacity sharply reduces. This is because the thickness of the tantalum pentoxide film increases at a formation voltage of 5 V or higher and the film is insulated. Thus, the formation voltage is determined to 3 V when a tantalum plate is employed. The formed tantalum pentoxide film had a thickness of 5 nm and had no formation color. The oxide film was formed in the range of 30% by area relative to the surface area of the collector.

(2) Forming of Electrodes

A mixed powder of PPQx and carbon powder (in a weight ratio of 75:25) for a cathode and a mixed powder of polycyanoindole (PCI) and carbon powder (in a weight ratio of 75:25) for an anode were each mixed with a 20% by weight sulfuric acid aqueous solution to be a paste. They were used to form electrodes in the form of a film on the collectors.

(3) Production of a Battery

The thus-formed electrodes are arranged as opposed to each other via a micro-porous separator and their peripheral portions are surrounded by a laminated material to complete a battery.

Description of Operation of Example 1

A charge/discharge cyclic test was performed to check its cyclic property of the battery of Example 1. In this test, a set of the steps of charging at 500 mAh up to 1.2 V followed by resting for 1 hour, then discharging at 500 mAh down to a final discharge voltage of 1.0 V followed by resting for 1 hour is defined as 1 cycle. The test results demonstrate that the capacity reduced to 80% of the initial capacity after 1,000 cycles.

Description of Effects of Example 1

As described later, the capacity reduced to 80% of the initial capacity after 500 cycles in Comparative Example 1 while the capacity reduced to 80% of the initial capacity after 1,000 cycles in Example 1. This means that the adherent property of the electrode to the collector did not reduce in Example 1. Because the oxide film was already formed on the surface of the collector at the time of forming the electrode and the voltage at the time of charge/discharge was lower than the formation voltage, the oxide film was inhibited from further growing in the collector surface. Accordingly, there is no variation in volume of the collector within the charging voltage range. Thus, the adherent property of the electrode to the collector does not reduce and the cyclic property improves.

COMPARATIVE EXAMPLE 1

Comparative Example 1 refers to a method for forming an electrode film without formation of a tantalum plate.

Comparative Example 1 is a battery producing process having two steps: (1) forming of electrodes; and (2) production of a battery.

Operation of Comparative Example 1

A charge/discharge cyclic test was performed to check its cyclic property of the battery of Comparative Example 1. The test results demonstrate that the capacity reduced to 80% of the initial capacity after 500 cycles. It was also observed that the electrode was peeled off the collector.

EXAMPLE 2

A tantalum plate is employed for a collector and a formed tantalum pentoxide film is disposed on the surface of the tantalum plate. Electrodes formed on collectors are arranged as opposed to each other via an insulating, ion-permeable micro-porous separator. A laminated material surrounds the peripheral portions of the electrodes to hold the electrodes.

A process for producing a battery according to Example 2 has three steps: (1) formation of tantalum collectors; (2) forming of electrodes; and (3) production of a battery.

(1) Formation of Tantalum Collectors

A 5-cm square tantalum plate and a SUS plate used for the opposed electrode were immersed into a 0.05–0.6% by weight phosphoric acid (nitric acid or sulfuric acid) solution, and a current of 100 mA/cm$^2$ was supplied thereto. The formation voltage was determined to 3 V. The formed tantalum pentoxide film had a thickness of 5 nm and had no transformation color. The oxide film was formed in the range of 70% by area relative to the surface area of the collector.

(2) Forming of Electrodes

A mixed powder of PPQx and carbon powder (in a weight ratio of 75:25) for a cathode and a mixed powder of PCI and carbon powder (in a weight ratio of 75:25) for an anode were each mixed with a 20% by weight sulfuric acid aqueous solution to be a paste. They were used to form electrodes in the form of a film on the collectors.

(3) Production of a Battery

The thus-formed electrodes were arranged as opposed to each other via a micro-porous separator and their peripheral portions were surrounded by a laminated material to complete a battery.

Operation of Example 2

A charge/discharge cyclic test was performed to check its cyclic property of the battery of Example 2. In this test, a set of the steps of charging at 500 mAh up to 1.2 V followed by resting for 1 hour, then discharging at 500 mAh down to a final discharge voltage of 1.0 V followed by resting for 1 hour is defined as 1 cycle. The test results demonstrate that the capacity reduced to 80% of the initial capacity after 2,000 cycles.

Description of Effects of Example 2

While the capacity reduced to 80% of the initial capacity after 1,000 cycles in Example 1, the capacity reduced to 80% of the initial capacity after 2,000 cycles in Example 2. The cyclic property improved in Example 2. This means that the increased formation current enlarged the ratio of the oxide film to the surface area of the collector to improve the adherent property of the electrode to the collector.

EXAMPLE 3

A tantalum plate was employed for a collector and a tantalum pentoxide film formed by gas-phase oxidization was disposed on the surface of the tantalum plate. Electrodes formed on collectors were arranged as opposed to each other via an insulating, ion-permeable micro-porous separator. A laminated material surrounded the peripheral portions of the electrodes to hold the electrodes.

A process for producing a battery according to Example 3 has three steps: (1) gas-phase oxidization of tantalum collectors; (2) forming of electrodes; and (3) production of a battery.

(1) Gas-Phase Oxidization of Tantalum Collectors

A 5-cm square tantalum plate was heated to form a tantalum pentoxide film in air at 400° C. to room temperature for 1 hour or in an oxidative ambient at 200° C. to room temperature for 1 hour. Conditions for the gas-phase oxidization were determined in the following manner. A tantalum plate was heated in air at 400° C. for 1 hour and then in an oxidative ambient at 200° C. for 1 hour to form a tantalum pentoxide film on the tantalum plate. The thickness of the tantalum pentoxide film was measured by a polarization analysis method. The thickness of the tantalum pentoxide film was equal to 5 nm. Thus, the heating conditions were determined as in air at 400° C. to room temperature for 1 hour and in an oxidative ambient at 200° C. to room temperature for 1 hour. No formation color could be observed. The oxide film was formed in the range of 40% by area relative to the surface area of the collector.

(2) Forming of Electrodes

A mixed powder of PPQX and carbon powder (in a weight ratio of 75:25) for a cathode and a mixed powder of PCI and carbon powder (in a weight ratio of 75:25) for an anode were each mixed with a 20% by weight sulfuric acid aqueous solution to be a paste. They were used to form electrodes in the form of a film on the collectors.

(3) Production of a Battery

The thus-formed electrodes were arranged as opposed to each other via a micro-porous separator and their peripheral portions were surrounded by a laminated material to complete a battery.

Operation of Example 3

A charge/discharge cyclic test was performed to check its cyclic property of the battery of Example 3. In this test, a set of the steps of charging at 500 mAh up to 1.2 V followed by resting for 1 hour, then discharging at 500 mAh down to a final discharge voltage of 1.0 V followed by resting for 1 hour is defined as 1 cycle. The test results demonstrate that the capacity reduced to 80% of the initial capacity after 2,000 cycles.

Description of Effects of Example 3

The collector oxidized in a gas phase in Example 3 also exhibited 2,000 cycles similar to that of a collector treated by formation. The cyclic property improved. This means that the gas-phase oxidization of the collector increased the ratio of the oxide film to the surface area of the collector and improved the adherent property of the electrode to the collector.

EXAMPLE 4

Tantalum plates, once immersed into a hydrofluoric acid solution and then rinsed in water, were oxidized in a gas phase to form electrodes. The electrodes were arranged as opposed to each other via an insulating, ion-permeable micro-porous separator. A laminated material surrounded the peripheral portions of the electrodes to hold the electrodes.

A process for producing a battery according to Example 4 has four steps: (1) etching of tantalum plates, (2) gas-phase oxidization of tantalum collectors; (3) forming of electrodes; and (4) production of a battery.

(1) Etching of Tantalum Plates

A 5-cm square tantalum plate was immersed into a hydrofluoric acid solution for 10 minutes and then rinsed in water.

(2) Gas-Phase Oxidization of Tantalum Collectors

The etched tantalum plate was heated to form an oxide film in air at 400° C. or below for 1 hour or in an oxidative ambient at 200° C. or below for 1 hour. The thickness of the oxide film formed on the surface was equal to 5 nm and no formation color could be observed. The oxide film was formed in the range of 40% by area relative to the surface area of the collector.

(3) Forming of Electrodes

A mixed powder of PPQx and carbon powder (in a weight ratio of 75:25) for a cathode and a mixed powder of PCI and carbon powder (in a weight ratio of 75:25) for an anode were each mixed with a 20% by weight sulfuric acid aqueous solution to be a paste. They were used to form electrodes in the form of a film on the collectors.

(4) Production of a Battery

The thus-formed electrodes were arranged as opposed to each other via a micro-porous separator and their peripheral portions were surrounded by a laminated material to complete a battery.

Operation of Example 4

A charge/discharge cyclic test was performed to check its cyclic property of the battery of Example 4. In this test, a set of the steps of charging at 500 mAh up to 1.2 V followed by resting for 1 hour, then discharging at 500 mAh down to a final discharge voltage of 1.0 V followed by resting for 1 hour is defined as 1 cycle. The test results demonstrate that the capacity reduced to 80% of the initial capacity after 4,000 cycles.

Description of Effects of Example 4

While the capacity reduced to 80% of the initial capacity after 600 cycles in Comparative Example 2 as described later, the capacity reduced to 80% of the initial capacity after 4,000 cycles in Example 4. This means that the adherent property of the electrode to the collector did not reduce in Example 4. Because the oxide film was already formed on the surface of the collector at the time of forming the electrode and the voltage at the time of charge/discharge was lower than the formation voltage, the oxide film was inhibited from further growing on the collector surface. Accordingly, there is no variation in volume of the collector within the charging voltage range. Thus, the adherent property of the electrode to the collector does not reduce and the cyclic property improves.

COMPARATIVE EXAMPLE 2

Comparative Example 2 refers to a method for forming an electrode in the form of a film without oxidizing a tantalum plate in a gas phase as described in Example 4.

A process for producing a battery according to Comparative Example 2 has three steps: (1) etching of tantalum plates; (2) forming of electrodes; and (3) production of a battery.

Operation of Comparative Example 2

A charge/discharge cyclic test was performed to check its cyclic property of the battery of Comparative Example 2. The test results demonstrate that the capacity reduced to 80% of the initial capacity after 600 cycles. It was also observed that the electrode was peeled off the collector.

EXAMPLE 5

A niobium plate was employed for a collector and a niobium pentoxide film formed by formation was disposed on the surface of the niobium plate. Electrodes formed on the collectors were arranged as opposed to each other via an insulating, ion-permeable micro-porous separator. A laminated material surrounded the peripheral portions of the electrodes to hold the electrodes.

A process for producing a battery according to Example 5 has three steps: (1) formation of niobium collectors; (2) forming of electrodes; and (3) production of a battery.

(1) Formation of Niobium Collectors

A 5-cm square niobium plate and a SUS plate used for the opposed electrode were immersed into a 0.05–0.6% by weight phosphoric acid (nitric acid or sulfuric acid) solution, and a current of 10 mA/cm$^2$ was supplied thereto. When the voltage reached up to 3 V, it was held during a holding time of 1 hour. The niobium pentoxide film formed on the surface had a thickness of 7.2 nm and had no formation color. The oxide film was formed in the range of 50% by area relative to the surface area of the collector.

(2) Forming of Electrodes

A mixed powder of PPQx and carbon powder (in a weight ratio of 75:25) for a cathode and a mixed powder of PCI and carbon powder (in a weight ratio of 75:25) for an anode were each mixed with a 20% by weight sulfuric acid aqueous solution to be a paste. They were used to form electrodes in the form of a film on the collectors.

(3) Production of a Battery

The thus-formed electrodes were arranged as opposed to each other via a micro-porous separator and their peripheral portions were surrounded by a laminated material to complete a battery.

Description of Operation of Example 5

A charge/discharge cyclic test was performed to check its cyclic property of the battery of Example 5. In this test, a set of the steps of charging at 500 mAh up to 1.2 V followed by resting for 1 hour, then discharging at 500 mAh down to a final discharge voltage of 1.0 V followed by resting for 1 hour is defined as 1 cycle. The test results demonstrate that the capacity reduced to 80% of the initial capacity after 1,000 cycles.

Description of Effect of Example 5

While the capacity reduced to 80% of the initial capacity after 350 cycles in Comparative Example 3 as described later, the capacity reduced to 80% of the initial capacity after 600 cycles in Example 5. This means that the adherent property of the electrode to the collector did not reduce in Example 5. Because the oxide film was already formed on the surface of the collector at the time of forming the electrode and the voltage at the time of charge/discharge was lower than the formation voltage, the oxide film was inhibited from further growing on the collector surface. Accordingly, there is no variation in volume of the collector within the charging voltage range. Thus, the adherent property of the electrode to the collector does not reduce and the cyclic property improves.

COMPARATIVE EXAMPLE 3

Comparative Example 3 refers to a method for forming an electrode in the form of a film without formation of a niobium plate.

A process for producing a battery according to Comparative Example 3 has two steps: (1) forming of electrodes; and (2) production of a battery.

Operation of Comparative Example 3

A charge/discharge cyclic test was performed to check its cyclic property of the battery of Comparative Example 3. The test results demonstrate that the capacity reduced to 80% of the initial capacity after 350 cycles. It was also observed that the electrode was peeled off the collector.

TABLE 1

|  | The number of cycles down to 80% of the initial capacity |
|---|---|
| Example 1 | 1000 |
| Example 2 | 2000 |
| Example 3 | 2000 |
| Example 4 | 4000 |
| Example 5 | 1000 |
| Comparative Example 1 | 500 |
| Comparative Example 2 | 600 |
| Comparative Example 3 | 350 |

As obvious from the above, first, an oxide film of a thickness of 1.7–10 nm is formed on the surface of a collector made of a valve action metal. The oxide film is formed in a range of from 30% by area or more to less than 100% by area relative to the surface area of the collector. An electrode is formed in the form of a film on the collector. The electrode is used for a secondary battery. The electrode and battery are excellent in cyclic property and film-forming property.

As the embodiments consistent with the present invention have been described, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A secondary battery comprising:
   a first collector made of a first valve action metal;
   a second collector made of a second valve action metal;
   a first electrode;
   a second electrode;
   a separator; and
   an outer can,
   wherein said first collector is covered with a first oxide film of a thickness of 1.7–10 nm, said first oxide film being formed in a range of from 30% by area to less than 100% by area relative to the surface area of said first collector, said first collector having said first electrode disposed thereon,
   wherein said second collector is covered with a second oxide film of a thickness of 1.7–10 nm, said second oxide film being formed in a range of from 30% by area to less than 100% by area relative to the surface area of said second collector, said second collector having said second electrode disposed thereon,
   wherein said first valve action metal comprises at least one of Ta and Nb.

2. The secondary battery of claim 1, wherein said second valve action metal is Ta or Nb.

3. The secondary battery of claim 1, wherein said first electrode is a mixture comprising polyphenylquinoxaline, carbon powder and a sulfuric acid aqueous solution.

4. The secondary battery of claim 1, wherein said second electrode is a mixture comprising polycyanoindole, carbon powder and a sulfuric acid aqueous solution.

5. The secondary battery of claim 1, wherein said separator is a micro-porous separator.

6. The secondary battery of claim 1, wherein said first oxide film is made of tantalum pentoxide or niobium pentoxide.

7. The secondary battery of claim 1, wherein said second oxide film is made of tantalum pentoxide or niobium pentoxide.

8. An electrode for a secondary battery which comprises a collector made of a valve action metal and a paste film formed on said collector,
   wherein said collector is covered with an oxide film of a thickness of 1.7–10 nm, said oxide film being formed in a range of from 30% by area to less than 100% by area relative to the surface area of said collector, and
   said paste film comprises a mixture comprising a polyhenylquinoxaline, a carbon powder and a sulfuric acid aqueous solution.

9. An electrode for a secondary battery, comprising:
   a collector made of a valve action metal and a paste film formed on said collector,
   wherein said collector is covered with an oxide film of a thickness of 1.7–10 nm, said oxide film being formed in a range of from 30% by area to less than 100% by area relative to the surface area of said collector, and
   said paste film comprises a mixture comprising a polycyanoindole, a carbon powder and a sulfuric acid aqueous solution.

10. The electrode of claim 8, wherein said valve action metal comprises one of Ta and Nb.

11. The electrode of claim 9, wherein said valve action metal comprises one of Ta and Nb.

12. The electrode of claim 8, wherein said oxide film is made of tantalum pentoxide or niobium pentoxide.

13. A method of producing a secondary battery comprising a first collector made of a first valve action metal, a second collector made of a second valve action metal, a first electrode, a second electrode, a separator and an outer can, said method comprising:
   forming a first oxide film of a thickness of 1.7–10 nm on said first collector, said first oxide film being formed in a range of from 30% by area to less than 100% by area relative to the surface area of said first collector;
   forming a second oxide film of a thickness of 1.7–10 nm on said second collector, said second oxide film being formed in a range of 30% to less than 100% by area relative to the surface area of said second collector;
   forming said first electrode on said first collector; and
   forming said second electrode on said second collector
   wherein said first valve action metal comprises one of Ta and Nb.

14. The electrode of claim 13, wherein said second valve action metal comprises one of Ta and Nb.

15. The method of claim 13, wherein said first electrode is a mixture comprising polyphenylquinoxaline, carbon powder and a sulfuric acid aqueous solution.

16. The method of claim 13, wherein said second electrode is a mixture comprising polycyanoindole, carbon powder and a sulfuric acid aqueous solution.

17. The method of claim 13, wherein said separator is a micro-porous separator.

18. The method of claim 13, wherein said first oxide film is made of tantalum pentoxide or niobium pentoxide.

19. The method of claim 13, wherein said second oxide film is made of tantalum pentoxide or niobium pentoxide.

20. The method of claim 13, wherein a formation voltage higher than the working voltage of said secondary battery is applied to said first collector to form said first oxide film.

21. The method of claim 20, wherein said formation voltage is 3 V.

22. The method of claim 13, wherein a formation voltage higher than the working voltage of said secondary battery is applied to said second collector to form said second oxide film.

23. The method of claim 22, wherein said formation voltage is 3 V.

24. A method of producing an electrode for a secondary battery, said method comprising:
    forming an oxide film of a thickness of 1.7–10 nm on a collector made of a valve action metal, said oxide film being formed in a range of from 30% by area to less than 100% by area relative to the surface area of said collector,
    forming a paste film on said collector,
        wherein said paste film comprises a mixture comprising a polyphenylquinoxaline, a carbon powder and a sulfuric acid aqueous solution.

25. A method of producing an electrode for a secondary battery, said method comprising:
    forming an oxide film of a thickness of 1.7–10 nm on a collector made of a valve action metal, said oxide film being formed in a range of from 30% by area to less than 100% by area relative to the surface area of said collector,
    forming a paste film on said collector comprises;
        wherein said paste film comprises a mixture comprising a polycyanoindole, carbon powder and a sulfuric acid aqueous solution.

26. The method of claim 24, wherein said valve action metal comprises one of Ta and Nb.

27. The method of claim 25, wherein said valve action metal comprises one of Ta and Nb.

28. The method of claim 24, wherein said oxide film is made of tantalum pentoxide or niobium pentoxide.

29. The method of claim 24, wherein a formation voltage higher than the working voltage of said secondary battery is applied to said collector to form said oxide film.

30. The method of claim 29, wherein said formation voltage is 3 V.

* * * * *